United States Patent
Büttner et al.

(10) Patent No.: US 10,921,585 B2
(45) Date of Patent: Feb. 16, 2021

(54) ARRANGEMENT AND METHOD FOR DISTURBANCE CORRECTION FOR IMAGING FLOW MEASURING PROCESSES

(71) Applicant: TECHNISCHE UNIVERSITÄT DRESDEN, Dresden (DE)

(72) Inventors: Lars Büttner, Dresden (DE); Jürgen Czarske, Dresden (DE); Martin Teich, Dresden (DE); Nektarios Koukourakis, Freital (DE)

(73) Assignee: TECHNISCHE UNIVERSITÄT DRESDEN, Dresden (DE)

( * ) Notice: Subject to any disclaimer, the term of this patent is extended or adjusted under 35 U.S.C. 154(b) by 0 days.

(21) Appl. No.: 16/628,391

(22) PCT Filed: Jul. 10, 2018

(86) PCT No.: PCT/EP2018/068669
§ 371 (c)(1),
(2) Date: Jan. 3, 2020

(87) PCT Pub. No.: WO2019/011916
PCT Pub. Date: Jan. 17, 2019

(65) Prior Publication Data
US 2020/0218064 A1     Jul. 9, 2020

(30) Foreign Application Priority Data

Jul. 11, 2017 (DE) ...................... 10 2017 211 837.7

(51) Int. Cl.
*G02B 27/00* (2006.01)
*G01F 1/66* (2006.01)
*G02B 26/06* (2006.01)

(52) U.S. Cl.
CPC ......... *G02B 27/0068* (2013.01); *G01F 1/661* (2013.01); *G02B 26/06* (2013.01)

(58) Field of Classification Search
CPC ...... G02B 27/0068; G02B 26/06; G01F 1/661
See application file for complete search history.

(56) References Cited

U.S. PATENT DOCUMENTS

| 7,118,216 B2 | 10/2006 | Roorda |
| 2010/0195048 A1 | 8/2010 | Hammer et al. |
| 2015/0160118 A1 | 6/2015 | Regelman |

FOREIGN PATENT DOCUMENTS

| CN | 204461710 U | 7/2015 |
| DE | 60223130 T2 | 8/2008 |
| WO | 2012100763 A1 | 8/2012 |
| WO | 2014122156 A1 | 8/2014 |

OTHER PUBLICATIONS

International Search Report (and English translation) and Written Opinion of the International Searching Authority for International Application No. PCT/EP2018/068669 dated Nov. 6, 2018.

(Continued)

*Primary Examiner* — Wen Huang
(74) *Attorney, Agent, or Firm* — Heslin Rothenberg Farley & Mesiti P.C.

(57) ABSTRACT

A generally time-varying boundary surface between a plurality of flowing fluids having different refractive indices, e.g. the boundary surface between water and air with an open water surface, produces an optical disturbance. Optical flow measurement procedures that occur through the boundary surface are affected by this disturbance, which can lead to significant measurement deviations or can even completely prevent a measurement from being made.
The invention contributes to solving this metrological problem by proposing arrangements and methods for instantaneous, hardware-based correction of optical disturbances caused by a fluctuating boundary surface. For this purpose, a wavefront modulator is introduced into the beam path of the optical measuring method, the modulator actively compensating for the optical disturbance by means of a control system.
The invention makes it possible to perform optical flow measurements through a fluctuating boundary surface. It is (Continued)

Figure 1:
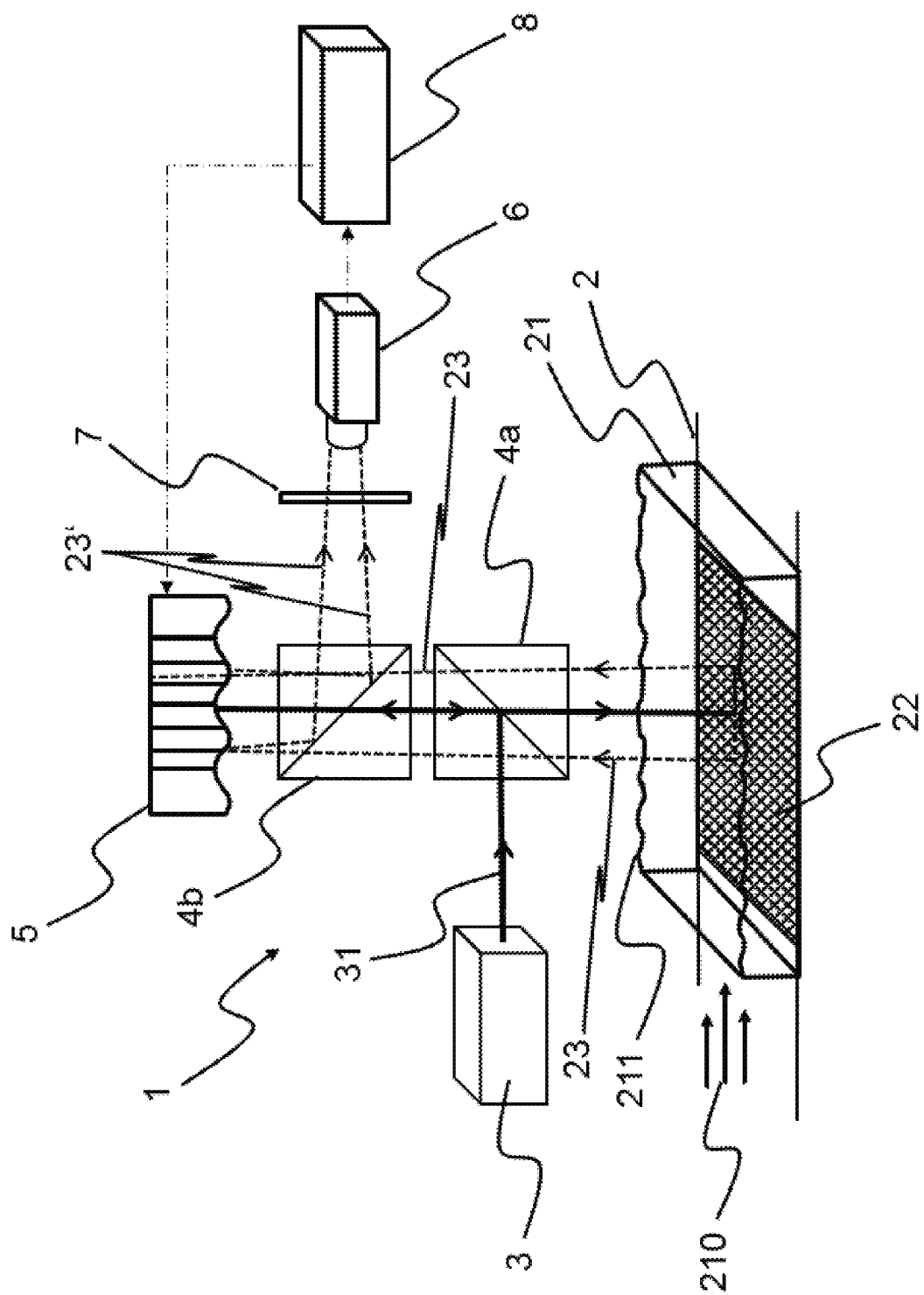

not limited to a single flow measurement technique, but can be implemented in all known imaging methods.

The invention can be used in a variety of technical applications. Some examples include: liquid-air boundary surfaces, e.g. in water channels with an open surface; film streams, e.g. in process techniques for cooling, purification or distillation; jets of fluid with surfaces fluctuating on all sides; measurements in levitated drops or drops adhering to an opaque base, or gas bubbles occurring in liquids. The invention is also suitable for the correction of disturbances caused by temperature gradients in combustion, pressure gradients, such as in pressure surges, or concentration gradients, such as in electrolysis processes.

20 Claims, 3 Drawing Sheets

(56) References Cited

OTHER PUBLICATIONS

Cui, M., et al., "Implementation of a digital optical phase conjugation system and its application to study the robustness of turbidity suppression by phase conjugation", Optics Express, vol. 18, No. 4, pp. 3444-3455 (2010).
Czarske, J.W., et al., "Adaptive flow-field measurements using digital holography", Proceedings of SPIE, vol. 10074, pp. S10074F-1-S100740F-7 (2017).
Richard, H., et al., "Principle and applications of the background oriented schlieren (BOS) method", Measurement Science and Technology, vol. 12, pp. 1576-1585 (2001).

ARRANGEMENT AND METHOD FOR DISTURBANCE CORRECTION FOR IMAGING FLOW MEASURING PROCESSES

CROSS REFERENCE TO RELATED APPLICATIONS

This application is a national stage filing under section 371 of International Application No. PCT/EP2018/068669, filed on Jul. 10, 2018, and published on Jan. 17, 2019 as WO 2019/011916, which claims priority to German Application No. 10 2017 211 837.7, filed on Jul. 11, 2017. The entire contents of WO 2019/011916 are hereby incorporated herein by reference.

The invention relates to an arrangement and a method for disturbance correction for flow measuring methods, in particular imaging flow measuring methods.

Many processes in chemical engineering involve fluids with different refractive indices which are separated by a boundary surface. This boundary surface usually changes over time. The resulting refractive index fluctuations represent a time-varying, fluctuating optical disturbance. This can significantly degrade the performance of optical measurement methods or make a measurement completely impossible. For example, in an open surface in a pool of water on which waves can form, there is a stochastic refraction of the light rays at the water-air boundary surface, and a measurement of the flow velocity in the water using the boundary surface is severely affected by the disturbance. Therefore, fluctuating boundary surfaces are a major challenge to flow measurement technology. This is technically relevant in a variety of applications, such as in film flows for cooling, cleaning or distillation, in jets of liquid, in levitated droplets, in wave channels, in flames or in flow with concentration gradients.

Static objects such as optical access windows can also cause optical disturbance, for example if they have a curvature.

Various approaches are known from the prior art which can contribute to solving the problem described. For static disturbance, it is possible to introduce a rigid corrective optic in the beam path. If the optical conditions change, for example if another image section is to be viewed or if the viewing is to be performed at a different angle, the corrective optics are no longer adapted to the situation, and optical disturbance occurs again.

Fluctuating disturbance cannot be compensated by means of rigid corrective optics. One approach, in particular for film flows, is the use of a stationary background image located on the wall of a flow channel, for example, and which at the same time is observed through the open surface for flow measurement purposes. Based on the distortion of the background image, which can represent a dot pattern, for example, conclusions about the distortion of the measurement image can be drawn and a software-based computational correction of the measurement image can be performed.

An example of such a software-based correction method is the Background Oriented Schlieren method (BOS). The method presented in In Richard, H. and Raffel, M.: *Principle and applications of the background oriented schlieren (BOS) method*. Measurement Science and Technology, 12 (2001), pp. 1576-1585, was developed essentially for the visualization of density or refractive index gradients in transparent media. It measures the apparent background point movement caused by refractive index gradients by first taking a picture of the background without the refractive index gradient between the background and the camera. This image is used as a reference image. The second required image—the measurement image—is recorded at the refractive index gradient to be examined which exists between the background and the camera. The background points are compared to the reference image on a different part of the image. By way of cross-correlation, the shift of the background points between the two images can be accurately determined if the background has an irregular dot pattern and there is a clear contrast. The result of the cross-correlation represents a displacement vector field between points on the reference image and points on the measurement image, and from this vector the refractive index gradient field can be calculated, which can ultimately be used for software correction of the flow measurement data. The BOS method does not offer a possibility for the correction of optical disturbance on the hardware side.

Various options for the correction of optical disturbances on the hardware side can be taken from the state of the art in the field of adaptive optics. Known methods include those in which phase aberrations can be detected and compensated by the use of wave front sensors and modulators. For example, DE 602 23 130 T2 discloses such methods for beam control of high-energy laser beams.

U.S. Pat. No. 7,118,216 B2 discloses a scanning laser ophthalmoscope for examining the ocular fundus, in which a portion of the light reflected from the retina is directed to a wavefront sensor in order to detect the wavefront distortion caused by the eye, wherein a deformable mirror disposed in the optical path is controlled so that the wavefront distortion is compensated so as to provide imaging. No special demands are made on the speed of the control system in this field of application.

Also in the field of microscopy, the application of adaptive optics is prior art technology, the aim here often being to improve the examination quality of biological samples. In Cui, M. and Yang, C. *Implementation of a digital optical phase conjugation system and its application to study the robustness of turbidity suppression by phase conjugation*. Optics Express 18, No. 4 (2010), p. 3444, introduces an open-loop adaptive optics control method, referred to as "digital optical phase conjugation," which is useful for correcting phase distortions using an optically murky, especially biological, medium. In this case, a CCD camera is used as a sensor and a surface light modulator is used as an actuator. The method described requires that each pixel of the camera produce a virtual image on a corresponding pixel of the surface light modulator, and vice versa. The method thus requires a complex calibration and a very high adjustment effort. Instantaneous corrections, especially to fluctuating disturbance, cannot be made.

Also known is the use of adaptive optics for the correction of optical distortions in small-scale boundary surfaces with scattering media at which the light is scattered directly and reflected in small areas.

US 2015/0160118 A1 shows an optical measuring system for measuring liquid samples which are mounted in the holes of microplates. The system includes, among other things, a light source for illuminating the samples and a detector for measuring the optical signals. Between the light source and the holes, an optical element such as a spatial light modulator is disposed, the modulator correcting distortions at the boundary surface of the liquid samples.

Czarske, J. W., Koukourakis, N., Fregin, B., König, J. and Büttner, L. *Adaptive flow-field measurements using digital holography*. Proceedings of SPIE, Vol. 10074 (2017), p. 10074F-1-100740E-7 describes flow measurements and the correction of optical disturbance by means of digital holography in the field of fluid measurement technology. Here, light is reflected on a diffusely scattering film. The effect of the multiple scattering associated therewith on the imaging process is reduced by the phase compensation of a modulator. This will restore the image at a reduced contrast.

US 2010/0195048 A1 discloses the use of adaptive optics in the medical field, especially for ophthalmoscopy, by which, inter alia, the retina of the eye is examined. In this case, a part of the eye is scanned by a first optical module, wherein the reflected light is conducted into a detection device and images the examined part of the eye. A second optical module detects and corrects the optical distortion. The scattering of the light at the tissue leads to multiple reflections, resulting in the inability for any defined boundary surfaces to form. Disadvantageously, the correction of the optical distortion at the retina can thus only take place in sections, namely line by line and thus in a small-scale region, since the first module has a line scanner for scanning the eye for this purpose. It is thus impossible to instantaneously correct the complete field of view. By basing the measuring method on a confocal design principle, the scattered light of the surrounding tissue layers is deliberately suppressed by pinholes in the beam path of the device so that it does not arrive in the detector and the optical imaging quality of the measurement region approached by the scanner is improved.

The object of the present invention is therefore to overcome the disadvantages of the prior art and to provide an arrangement and a method by means of which optical disturbance caused by a continuous phase transition boundary surface between two fluids with different optical densities can be corrected instantaneously and on the hardware side. In particular, the arrangement and the method is to make possible a large-scale correction of the optical disturbance at optically flat and large-scale boundary surfaces using the Fresnel reflex.

The object is achieved by a wavefront-sensorless arrangement for correcting optical disturbance caused by a boundary surface, the arrangement having the features of claim 1, and a wavefront sensor-based arrangement for correcting optical disturbance caused by a boundary surface, the arrangement having the features of claim 9, as well as a wavefront-sensorless method for correcting optical disturbances caused by a boundary surface, the method having the features of claim 8, and a wavefront sensor-based method for correcting optical disturbance caused by a boundary surface, the method having the features of claim 16. Further developments of the invention are specified in dependent claims.

For imaging flow measurement methods which are used for measuring, for example, for determining the flow velocity of a flowing fluid, the solution according to the invention is based on correcting optical disturbances caused by a boundary surface using a wavefront modulator. The solution according to the invention can be implemented without a wavefront sensor or with a wavefront sensor.

Advantageously, the solution according to the invention offers the possibility for hardware-based, instantaneous correction of optical disturbance. It is particularly advantageous that the invention can be operated in real time by using fast components and algorithms. By "real-time" it is to be understood that the frequency of the reaction to the fluctuation or temporal change of the optical disturbance, i.e. the targeted change in the settings of the wavefront modulator, is higher than the fluctuation frequency of the optical disturbance.

The term "boundary surface" as an area in which fluids with different optical density or different refractive indices meet, comprises, in the context of the invention optically large-scale, flat and continuous phase transition boundary surfaces. At these boundary surfaces, light is reflected according to the Fresnel formulas. According to the invention, in addition to boundary surfaces such as the water-air boundary surface at a pool of water or optical access windows, the term "boundary surface" also includes boundary layers, such as in flames in the form of temperature gradients, or boundary layers due to concentration gradients. The invention is especially suitable for fluctuating boundary surfaces, but also for static boundary surfaces, for example optical access windows.

The term "fluid" is understood to mean a liquid, a gas or a vapor, i.e. a non-solid continuum to which the laws of fluid mechanics are applicable.

A "wavefront modulator" in the context of this invention is a device for selectively influencing the phase and/or the amplitude of a light wave. The wavefront modulator can have individually controllable elements as actuators and thus a pixel structure, or a continuously variable actuator layer. The wavefront modulator may be transmissive or have a reflective illuminated surface.

The invention can be applied to all imaging flow methods in which an image field of the flow is viewed in a non-contact fashion using a camera. Examples include Particle Imaging Velocimetry (PIV), Particle Tracking Velocimetry (PTV), Molecular Tagging Velocimetry (MTV) or Doppler Global Velocimetry. Most preferably, the invention is used in the PIV process.

To measure the flow, the flowing fluid must contain particles which interact with the illumination used in the imaging flow measurement method. If the flowing fluid is transparent, it is most common for particles called "tracers" to be introduced as objects of measurement into the flowing fluid, the tracers visualizing the flow without significantly affecting it. The tracer comprises scattering particles or particles designed to be fluorescent, referred to below as fluorescent particles. For the purposes of the invention, the scattering particles have no fluorescent properties. Further, the scattering particles are designed to realize the scattering. In embodiments, the scattering particles are formed as silver-coated hollow glass spheres with a diameter of about 10 µm. For the purposes of the invention, the fluorescent particles have fluorescent properties and emit light in accordance with Stokes' rule.

In the following, in the sense of a simplified notation, the terms "scattering" or "scattered light" are used, whereby in the case of scattering particles they refer to diffuse reflection and in the case of fluorescent particles they refer to the emitted light.

If the flowing fluid has intrinsic scattering particles or intrinsic fluorescent particles by means of which the flow can be visualized, the addition of tracers is not necessary. The intrinsically formed scattering particles or fluorescent particles are summarized below under the term "intrinsic particles." Unless stated otherwise, the term "tracer" is always used below, wherein when intrinsic particles exist in the fluid, what is meant are the intrinsic particles instead of the tracer.

The wavefront-sensorless device according to the invention for the correction of interfacial optical disturbances in imaging flow measurement methods used to measure a flowing fluid, wherein the flowing fluid contains tracers designed as scattering particles, comprises an illumination source configured to illuminate a measurement field through which the flowing fluid flows, wherein located in the measurement field illuminated by the illumination source is a stationary, characteristic optical pattern, often referred to as a "background pattern." For example, a laser is used as the illumination source. For example, the measuring field can be the region of a flow channel through which the flowing fluid flows and which is illuminated by the illumination source.

Furthermore, the wavefront-sensorless arrangement according to the invention has a camera which is designed for recording the flow image and the pattern image, in particular simultaneously. In this case, the image of the light scattered by the tracers in the flowing fluid is referred to as the "flow image" and the image of the light scattered by the stationary background pattern is referred to as a "pattern image." The flow pattern corresponds to a direct depiction of what happens to the measurement objects in the flow stream. The term "camera" in the context of the invention includes all optical equipment with which an image can be recorded on a storage medium and/or transmitted through an interface for further processing, for example it can also include detector arrays.

The illumination source and/or the camera are disposed in such a way that the illumination and/or the observation of the flowing fluid and the background pattern takes place through a boundary surface. In particular, both the illumination source and the camera are arranged so that the illumination and the observation of the flowing fluid takes place through a boundary surface.

Furthermore, the wavefront-sensorless arrangement according to the invention has a controllable wavefront modulator which is disposed in the optical path between the measuring field and the camera or in the optical path between the illumination source and the measuring field or in the optical path between the illumination source and the measuring field and between the measuring field and the camera. The controllable wavefront modulator is preferably disposed in the optical path between the measuring field and the camera.

Furthermore, the wavefront-sensorless arrangement according to the invention has a signal processing platform which is designed to evaluate at least the pattern image, wherein the pattern image is compared with the background pattern to determine a quality factor of the image, and the wavefront modulator is controlled for purposes of the alignment thereof. For this purpose, the signal processing platform communicates with the camera and the wavefront modulator, wherein the communication connection can be hard-wired or wireless. The wavefront modulator is driven by the signal processing platform in such a way that the quality factor is iteratively optimized.

O. B. d. A. is the quality factor as a measure of the optical similarity of the pattern image, i.e. the image of the background pattern, with the actual background pattern, defined in such a way that it increases with increasing optical similarity between the pattern image and the background pattern. In this case, the wavefront modulator is controlled and aligned by the signal processing platform in such a way that the quality factor of the image of the background pattern made in the camera after the light scattered by the background pattern has interacted with the wavefront modulator is increased. Examples of suitable quality factors include sharpness metrics such as the maximum spatial frequency, the maximum standard deviation, the brightness histogram, the intensity gradient or the cross-correlation coefficient. The normalized cross-correlation coefficient is 1, where a normalized cross-correlation coefficient of 1 corresponds to a complete match between the pattern image and the background pattern.

Of course, the quality factor can also be defined in another suitable form, for example in such a way that it decreases with increasing optical similarity, i.e. decreasing deviation, between the pattern image and the background pattern, and it is understood that the control of the wavefront modulator is then such that the quality factor decreases. In any case, the wavefront modulator is driven in such a way that the optical similarity between the pattern image and the background pattern increases. In other words, the adjustment of the wavefront modulator is tailored such that the optical disturbance caused by the boundary surface is corrected, preferably compensated as far as possible.

By correcting the optical disturbance by optimizing the image of the background pattern and correspondingly adjusting the wavefront modulator, the image of the tracer, i.e. the flow image, is also corrected. The evaluation of the flow image is preferably carried out using the same signal processing platform as the evaluation of the pattern image, but can also take place using another suitable signal processing platform.

In addition to the components mentioned, the wavefront-sensorless arrangement according to the invention can also have further suitably arranged optical components, in particular beam splitters, reflection prisms and filter elements.

The optimization of the quality factor takes place in an iterative way. The optimization is completed when the quality factor reaches an optimum. Alternatively, it is also possible to specify a limit value for the quality factor to be achieved during the optimization.

Since in the case of a fluctuating or time-varying disturbance the quality factor deviates from the optimum value over time, the optimization algorithm is repeated continuously. It is thus possible to react instantaneously to changes in the optical disturbance caused by the boundary surface.

The wavefront-sensorless arrangement is characterized by a particularly simple structure and is therefore inexpensive to implement among other things. In addition, the wavefront-sensorless arrangement requires no additional optical access to the measuring point.

In an embodiment of the inventive wavefront-sensorless device, the flowing fluid contains fluorescent particles and the pattern is non-fluorescent, or the pattern is fluorescent and the flowing fluid contains no fluorescent particles, or the flowing fluid contains fluorescent particles and the pattern is fluorescent wherein the fluorescence wavelength of the fluorescent particles and that of the pattern are different from each other. If the flowing fluid contains tracers or intrinsic particles, these can either be introduced into the fluid as fluorescent particles or the fluid comprises intrinsically fluorescent particles by means of which the flow can be visualized so that the addition of tracers is not necessary. If the pattern is fluorescent, it is to be understood that the material, for example the paint from which the pattern is made, comprises at least one fluorescent ingredient. "Fluorescent" means that the particles or at least one component of the pattern are optically set to an excited state by illumination and relax within a short time (of the order of magnitude of approximately ms and smaller) after excitation with emission of light. The wavelength of the scattered light (fluorescence wavelength) is generally greater than the wavelength of the illumination (Stokes' rule). It is understood that the term "wavelength" as used herein always includes a certain, narrow wavelength range of a few tens of nm about the wavelength, such as the natural linewidth of a spectral line, or the line width of the fluorescent light which is subject to line broadening mechanisms (e.g. the Doppler effect due to thermal movement).

In the embodiment described, the wavefront-sensorless arrangement according to the invention comprises a first and a second camera. Means for wavelength selection are disposed in the optical path between the measuring field and the two cameras. The means for wavelength selection are designed so that light of a first wavelength is detected by a first camera and light of a second wavelength is detected by a second camera.

The described embodiment advantageously makes it possible to separate the flow pattern and the pattern image since the wavelength of the light scattered at the tracers of the flowing fluid and the wavelength of the light scattered at the pattern are different from each other. For example, if the flowing fluid contains fluorescent particles while the pattern is non-fluorescent, the wavelength of the light scattered by the fluorescent particles is generally greater than the wavelength of the light scattered at the pattern, which is equal to the illuminating wavelength. Using the means for wavelength selection, the o. B. d. A. flow image is then displayed on the first camera, and the pattern image is displayed on the second. The same applies if the pattern is designed to be fluorescent and the particles are non-fluorescent, or if the flowing fluid contains fluorescent particles and the pattern image is designed to be fluorescent, wherein the fluorescence wavelengths are different from each other.

In one embodiment version, the wavelength selection means may be designed as a partial reflection means comprising a mirroring arrangement acting as a wavelength-dependent beam splitter, wherein light of a first wavelength is predominantly deflected in the direction of the one camera and light of a second wavelength is deflected predominantly in the direction of the second camera. The means for partial reflection are thus designed such that, for example, light of the first wavelength is reflected predominantly in the direction of the one camera and light of the second wavelength is transmitted predominantly in the direction of the second camera, or for example such that light of the first wavelength is transmitted predominantly in the direction of the first camera and light of the second wavelength is reflected predominantly in the direction of the second camera.

Advantageously, in this embodiment a large part of the scattered light is used for imaging.

In a further embodiment of the embodiment variant, the means for wavelength selection may comprise a wavelength-independent beam splitter and wavelength-selective filter elements. By means of the wavelength-independent beam splitter, the light scattered at the tracers or at the pattern is split independently of the light's wavelength into a first and a second component with propagation directions different from each other, the first and second components can contain scattered light both at the tracers and at the pattern. Between the beam splitter and the first camera, filter elements are disposed in the optical path of the first portion, by means of said filter elements light of the first wavelength can pass the filter elements in the direction of the first camera or be deflected in the direction of the first camera, wherein light of the second wavelength cannot pass the filter elements or is deflected so that no image occurs at the first camera. For example, only the flow pattern is displayed at the first camera. Disposed between the beam splitter and the second camera in the optical path of the second portion are filter elements through which light of the second wavelength can pass in the direction of the second camera or be deflected in the direction of the second camera, wherein light of the first wavelength cannot pass through the filter elements or is deflected so that no image occurs at the second camera. Then, the only thing remaining in the above example is the pattern image displayed at the second camera.

This embodiment is characterized by a particularly simple and inexpensive design.

In a further embodiment, the wavefront modulator of the wavefront-sensorless device according to the invention comprises a combination of a plurality of adaptive optical correction elements. For example, image tilting can be corrected by electrically operated galvanometer mirrors and defocus aberrations can be corrected by adaptive lenses. Any remaining optical disturbances can be corrected by a surface light modulator, for example. In particular, the individual adaptive optical correction elements are operated in series and in each case by a control circuit assigned to the respective correction element.

In another embodiment, the wavefront modulator of the inventive wavefront-sensorless device is based on a surface light modulator having a reflective illuminated surface. Preferably, the reflective surface light modulator comprises a deformable mirror having a continuously illuminated surface or an array of micromirrors that are individually alignable.

In a further embodiment of the inventive wavefront-sensorless device, the signal processing platform has an FPGA (Field Programmable Gate Array) or a graphics processor or a digital signal processor or a combination thereof. These components of the digital control system are advantageously characterized by low latency periods. In order to achieve a real-time operation for the disturbance correction as far as possible, the control rate of the control of the wavefront modulator must be at least twice as high as the maximum fluctuation frequency of the optical disturbance.

The inventive method for wavefront-sensorless correction of optical disturbances caused by a boundary surface in imaging flow measurement method for measuring a flowing fluid, wherein the flowing fluid contains tracers designed as scattering particles, and wherein disposed in the measuring field illuminated by an illumination source, the flowing fluid flowing through the measuring field, is a stationary optical pattern, is characterized in that the flowing fluid is illuminated with an illumination source, the wavefront modulator, which is disposed in the optical path between the measuring field and a camera or in the optical path between the illumination source and the measuring field or in the optical path between the illumination source and the measuring field and between the measuring field and the camera, wherein the camera is used at least for recording the flow image as a disturbance-imposed image of the light scattered by the tracers in the flowing fluid and for recording the pattern image as a disturbance-imposed image of the light scattered by the stationary pattern, being controlled by a signal processing platform such that a quality factor determined by comparing the pattern image with the pattern is iteratively optimized.

Due to the fact that the orientation of the wavefront modulator is made so that the pattern image is corrected and disturbances caused by the boundary surface in the pattern image are preferably largely compensated, the flow image is corrected and these disturbances in the flow pattern are preferably largely compensated.

Such a wavefront-sensorless method according to the invention can have, for example, the following method steps:

a. illuminating the measuring field, through which the flowing fluid comprising the tracer flows and in which a stationary background pattern is disposed;
b. scattering of the light at the tracers and at the stationary background pattern;
c. interacting the light scattered by the tracers and the background pattern with the wavefront modulator;
d. recording the flow image as a disturbance-imposed image of the light scattered by the tracers and of the pattern image as a disturbance-imposed image of the light scattered by the stationary pattern by means of the camera, wherein the illumination and/or the observation of the flowing medium and the background pattern takes place through a boundary surface;
e. separating flow image and pattern image by means of the signal processing platform;
f. determining quality factor of the image by comparing the pattern image with the actual background pattern by means of the signal processing platform;
g. controlling the wavefront modulator as to the orientation thereof by means of the signal processing platform;
h. repeating process steps a. through g. with the aim of optimizing the quality factor, i.e. minimizing the deviation of the pattern image from the actual background pattern.

For optimization purposes, a variety of suitable algorithms known to the person skilled in the art can be used; by way of example, linear searching or a generic algorithm may be mentioned.

Naturally, features and details of the wavefront-sensorless arrangement described in accordance with the invention also apply in connection with the method according to the invention for correcting optical disturbances in the wavefront-sensorless and vice versa.

In the inventive wavefront sensor-based arrangement for correcting optical disturbances caused by a boundary surface in imaging flow measurement methods for measuring a flowing fluid, the flowing fluid contains tracers which are designed as fluorescent particles. That is to say that either fluorescent particles are introduced into the fluid for its measurement, or the fluid has intrinsically fluorescent particles by means of which the flow can be visualized, so that the addition of tracers is not necessary.

The inventive wavefront sensor-based arrangement has at least one illumination source, for example a laser, by means of which a measuring field and thus the flowing fluid is illuminated with light of at least one illumination wavelength through an optical disturbance-causing boundary surface.

Furthermore, the wavefront sensor-based arrangement according to the invention has a wavefront sensor designed to detect the light reflected from the boundary surface according to the Fresnel formulas, this light having the at least one illumination wavelength. For the Fresnel formulas to be applicable, the boundary surfaces must be optically flat, continuous and large-scale. In this case, a "wavefront sensor" is an arrangement by means of which a wave surface test for determining the shape of the surfaces of the same phase of a wave can be carried out. By means of the wavefront sensor, deformations of the wavefront can be determined instantaneously.

The wavefront sensor-based arrangement according to the invention also has a camera, by means of which the flow image is recorded, the flow image representing the disturbance-imposed image of the light scattered by the tracers of the flowing fluid, this light having a different wavelength from the at least one illumination wavelength. Therefore, in the case of a wavefront sensor-based arrangement, the tracers are preferably designed as fluorescent particles.

To separate these two light components with wavelengths which are different from one another, means for partial reflection are disposed in the optical path between the measuring field and the wavefront sensor and between the measuring field and the camera, said means having a mirroring arrangement, which is also called "dichroic," the degree of reflection and transmittance of which is a function of the wavelength of the light and which thereby acts as a wavelength-dependent beam splitter. These means for partial reflection act such that light of the at least one illumination wavelength, in particular the light reflected by the boundary surface, is deflected predominantly in the direction of the wavefront sensor, and light of a wavelength different from the at least one illumination wavelength, in particular that of the fluorescent particles scattered light is deflected primarily towards the camera. By way of example, the means for partial reflection act in such a way that light of the at least one illumination wavelength is predominantly reflected in the direction of the wavefront sensor and light of a wavelength different from the at least one illumination wavelength is transmitted predominantly in the direction of the camera. Or, these means act in such a way that light of the at least one illumination wavelength is transmitted predominantly in the direction of the wavefront sensor, and light of a wavelength different from the at least one illumination wavelength is predominantly reflected in the direction of the camera.

In a further preferred embodiment, the flowing fluid contains scattering particles, wherein the measuring field through which the flowing fluid flows is illuminated through the boundary surface by light from a first illumination source with an illumination wavelength and the scattering particles are illuminated with light from a second illumination source at a wavelength different from the illumination wavelength. In this case, the camera is designed for recording the flow pattern as an image of the light at the wavelength which is different from the illumination wavelength and which is scattered by the scattering particles of the flowing fluid. The means for partial reflection disposed between the measuring field and the camera are designed as beam splitters. The wavefront sensor-based arrangement according to the invention furthermore has a controllable wavefront modulator which is located in the optical path between the measuring field and the camera and between the measuring field and the wavefront sensor or in the optical path between the at least one illumination source and the measuring field or in the optical path between the at least one illumination source and the measuring field and between the measuring field and the camera and between the measuring field and the wavefront sensor. The controllable wavefront modulator is preferably disposed in the optical path between the measuring field and the camera and between the measuring field and the wavefront sensor.

In addition, the wavefront sensor-based arrangement according to the invention has at least one signal processing platform which is designed to at least evaluate the data detected by the wavefront sensor with the aim of determining the wavefront distortion due to the optical disturbance caused by the boundary surface and to control the wavefront modulator. For this purpose, the signal processing platform communicates at least with the wavefront sensor and with the wavefront modulator, wherein the communication connection can be wire-based or wireless. The control of the wavefront modulator takes place by means of the signal processing platform such that by interaction with the wavefront modulator, essentially transmission and/or reflection, the wavefront distortion caused by scattering at the boundary surface is corrected, preferably largely compensated. By way of example, the wavefront modulator can be aligned in such a way that, when the light interacts with the wavefront modulator, the inverse of the wavefront distortion measured by means of the wavefront sensor is imposed on the light. Preferably, the signal processing platform is also used to evaluate the flow pattern; however, the evaluation of the flow pattern can also be carried out on a second signal processing platform.

In addition to the components mentioned, the wavefront sensor-based arrangement according to the invention can also have further, suitably disposed optical components, in particular further beam splitters, reflection prisms and/or filter elements.

The inventive wavefront sensor-based arrangement operates as a closed control loop. In order to be able to perform the control in real time, the refresh rate of the control loop is at least twice as high as the maximum fluctuation frequency with which the optical disturbance caused by the boundary surface changes.

Advantageously, the wavefront sensor-based arrangement according to the invention allows the instantaneous, hardware-based correction of optical disturbances caused by a boundary surface without a potentially time-consuming and time-robbing iteration method. A further advantage of the wavefront sensor-based arrangement is that a clear result is achieved for controlling the wavefront modulator, whereas the use of iteration methods can potentially also lead to the determination of several solutions.

In one embodiment of the inventive wavefront sensor-based arrangement, the wavefront sensor comprises a Hartmann-Shack type sensor by means of which the phase information of the light of the at least one illumination wavelength reflected from the boundary surface is converted into a measurable intensity distribution. A Hartmann-Shack sensor generally consists of a microlens matrix and a spatially resolving detector. The position of the dot image produced by each microlens on the detector provides information about the local tilt of the wavefront. From the totality of all point images, the wavefront can be reconstructed and thus a possible distortion of the wavefront can be determined.

In a further embodiment of the wavefront sensor-based arrangement according to the invention, the wavefront sensor comprises an arrangement for carrying out holographic measurements. The wavefront sensor detects the spatial intensity distribution of an interference pattern which results from the coherent superposition of the light of the illumination wavelength reflected by the boundary surface with a reference wave. Particularly preferably, the reference wave is generated by beam splitting of the light emitted by the illumination source. Advantageously, holography offers the possibility of determining, in particular, the phase deformation of the light reflected by the boundary surface quickly and without complex iterations.

In a further embodiment, the wavefront modulator of the wavefront sensor-based arrangement according to the invention comprises a combination of a plurality of adaptive optical correction elements. For example, image tilting can be corrected by electrically-operated galvanometer mirrors and defocus aberrations can be corrected by adaptive lenses. Any remaining optical disturbances can be corrected by a surface light modulator, for example. In particular, the individual adaptive optical correction elements are operated in series and in each case by a control circuit assigned to the respective correction element.

In another embodiment, the wavefront modulator of the wavefront sensor-based device according to the invention is based on a surface light modulator having a reflective illuminated surface. Preferably, the reflective surface light modulator comprises a deformable mirror having a continuously illuminated surface or an array of micromirrors that are individually alignable.

In a further embodiment of the wavefront sensor-based arrangement according to the invention, the signal processing platform has an FPGA (Field Programmable Gate Array) or a graphics processor or a digital signal processor or a combination thereof. These components of the digital control system are advantageously characterized by low latency periods. In order to achieve a real-time operation for the disturbance correction as far as possible, the control rate for controlling the wavefront modulator should be at least twice as high as the maximum fluctuation frequency of the optical disturbance.

In a further embodiment of the wavefront sensor-based arrangement according to the invention, the illumination source emits at least two wavelengths that are different from one another for illuminating the flowing fluid, or the wavefront sensor-based arrangement according to the invention has at least two illumination sources emitting wavelengths that are different from one another for illuminating the flowing fluid. From these at least two wavelengths, a "synthetic wavelength" greater than each of the at least two wavelengths can be calculated, thereby increasing the range of clarity of the wavefront inspection. The light with at least two wavelengths that are different from one another reflected at the boundary surface is superimposed and the wavefront distortion due to the optical disturbance caused by the boundary surface is determined by the wavefront sensor analogous to the "absolute distance interferometry" method, known from the prior art, as an absolute phase deviation. The orientation of the wavefront modulator then takes place with respect to the measurement of the absolute phase deviation. This embodiment is particularly advantageous in the consideration of unsteady disturbances, as caused for example by rough boundary surfaces.

In the wavefront sensor-based method for compensating optical disturbances caused by a boundary surface in imaging flow measurement techniques for measuring a flowing fluid, the flowing fluid contains tracers designed as fluorescent particles, either as tracers in the fluid, or the fluid intrinsically having fluorescent particles. The method according to the invention comprises at least the following method steps:

a. illuminating a measuring field, and thereby the flowing fluid, with light of at least one illumination wavelength through the boundary surface and interacting the flowing fluid with the light of at least one illumination wavelength, wherein after reflection according to the Fresnel formulas at the boundary surface, the light has the at least one illumination wavelength, and after scattering at the fluorescent particles of the flowing fluid, the light has a different wavelength from the at least one illumination wavelength;

b. separating the entirety of the light reflected from the boundary surface and the light scattered by the fluorescent particles as a function of the wavelength into a portion having the at least one illumination wavelength and a portion having a different wavelength from the at least one illumination wavelength;

c. deflecting the portion having at least one illumination wavelength in the direction of a wavefront sensor, detecting the portion having the at least one illumination wavelength by means of the wavefront sensor and evaluating the detected data by means of a signal processing platform for determining wavefront distortion;
d. deflecting the portion having a wavelength different from the at least one illumination wavelength in the direction of a camera and imaging the flow pattern on the camera;
e. evaluating the flow image by means of the one or a second signal processing platform;

wherein using a controllable wavefront modulator, an interaction takes place of the light reflected from the boundary surface and the light scattered by the fluorescent particles, or the light serving to illuminate the flowing fluid, or the light serving to illuminate the flowing fluid and the reflected light from the boundary surface and the light scattered by the fluorescent particles, and the wavefront modulator is controlled by means of the signal processing platform in such a way as to orient the modulator so that the wave front distortion is corrected by interaction with the wavefront modulator.

The wavefront sensor-based method according to the invention can take place as follows, for example:
i. illuminating the measuring field and thus the flowing fluid with light of at least one illumination wavelength through the boundary surface and interaction of the flowing fluid with the light of at least one illumination wavelength, wherein after reflection at the boundary surface the light has the at least one illumination wavelength and after scattering at the fluorescent particles of the flowing fluid the light has a different wavelength from the at least one illumination wavelength;
ii. interacting the light reflected from the boundary surface and the light scattered by the fluorescent particles with a controllable wavefront modulator;
iii. separating the entirety of the light reflected from the boundary surface and the light scattered by the fluorescent particles as a function of the wavelength into a portion having the at least one illumination wavelength and a portion having a different wavelength from the at least one illumination wavelength;
iv. deflecting the portion having at least one illumination wavelength in the direction of a wavefront sensor, detecting the portion having the at least one illumination wavelength by means of the wavefront sensor and evaluating the detected data by means of a signal processing platform for determining wavefront distortion;
v. deflecting the portion having a wavelength different from the at least one illumination wavelength in the direction of a camera and imaging the flow pattern on the camera;
vi. adjusting the controllable wavefront modulator by means of the signal processing platform such that by interaction with the wavefront modulator, the wavefront distortion is compensated;
vii. evaluating the flow image by means of the one or a second signal processing platform.

Another possible sequence of the inventive wavefront sensor-based method is as follows, for example:
i'. interacting the light of at least one illumination wavelength for illuminating the flowing fluid with a controllable wavefront modulator;
ii'. illuminating the measuring field and thus the flowing fluid with the light of at least one illumination wavelength through the boundary surface and interacting the flowing fluid with the light of at least one illumination wavelength, wherein after reflection at the boundary surface the light has the at least one illumination wavelength and after scattering at the fluorescent particles of the flowing fluid the light has a different wavelength from the at least one illumination wavelength;
iii'. separating the entirety of the light reflected from the boundary surface and the light scattered by the fluorescent particles as a function of the wavelength into a portion having the at least one illumination wavelength and a portion having a different wavelength from the at least one illumination wavelength;
iv'. deflecting the portion having at least one illumination wavelength in the direction of a wavefront sensor, detecting the portion having the at least one illumination wavelength by means of the wavefront sensor and evaluating the detected data by means of a signal processing platform for determining wavefront distortion;
v'. deflecting the portion having a wavelength different from the at least one illumination wavelength in the direction of a camera and imaging the flow pattern on the camera;
vi'. adjusting the controllable wavefront modulator by means of the signal processing platform such that by interaction with the wavefront modulator, the wavefront distortion is compensated;
vii'. evaluating the flow image by means of the one or a second signal processing platform.

The possible sequences of the wave front sensor-based method according to the invention described can also be combined with one another such that both the light serving to illuminate the flowing fluid and the light reflected by the boundary surface and the light scattered by the fluorescent particles interact with the controllable wavefront modulator.

In particular, the method according to the invention can also be used such that the measuring field is illuminated with at least two illumination wavelengths and, in analogy to the "absolute distance interferometry" method known from the prior art, the absolute phase deviation of the disturbance is determined by means of the wavefront sensor and used to align the wavefront modulator.

Features and details of the wavefront sensor-based arrangement described in accordance with the invention naturally also apply in connection with the method according to the invention for wavefront sensor-based correction of optical disturbance and vice versa.

The invention is not limited to the illustrated and described embodiments, but also includes all embodiments which have the same effect in the context of the invention. Furthermore, the invention is not limited to the specifically described combinations of features, but may also be defined by any other combination of specific features of all individually disclosed individual features, unless the individual features are mutually exclusive, or unless a specific combination of individual features is explicitly excluded.

The invention is explained below by way of example with reference to figures, without being limited thereto.

Shown are

Figure 2:
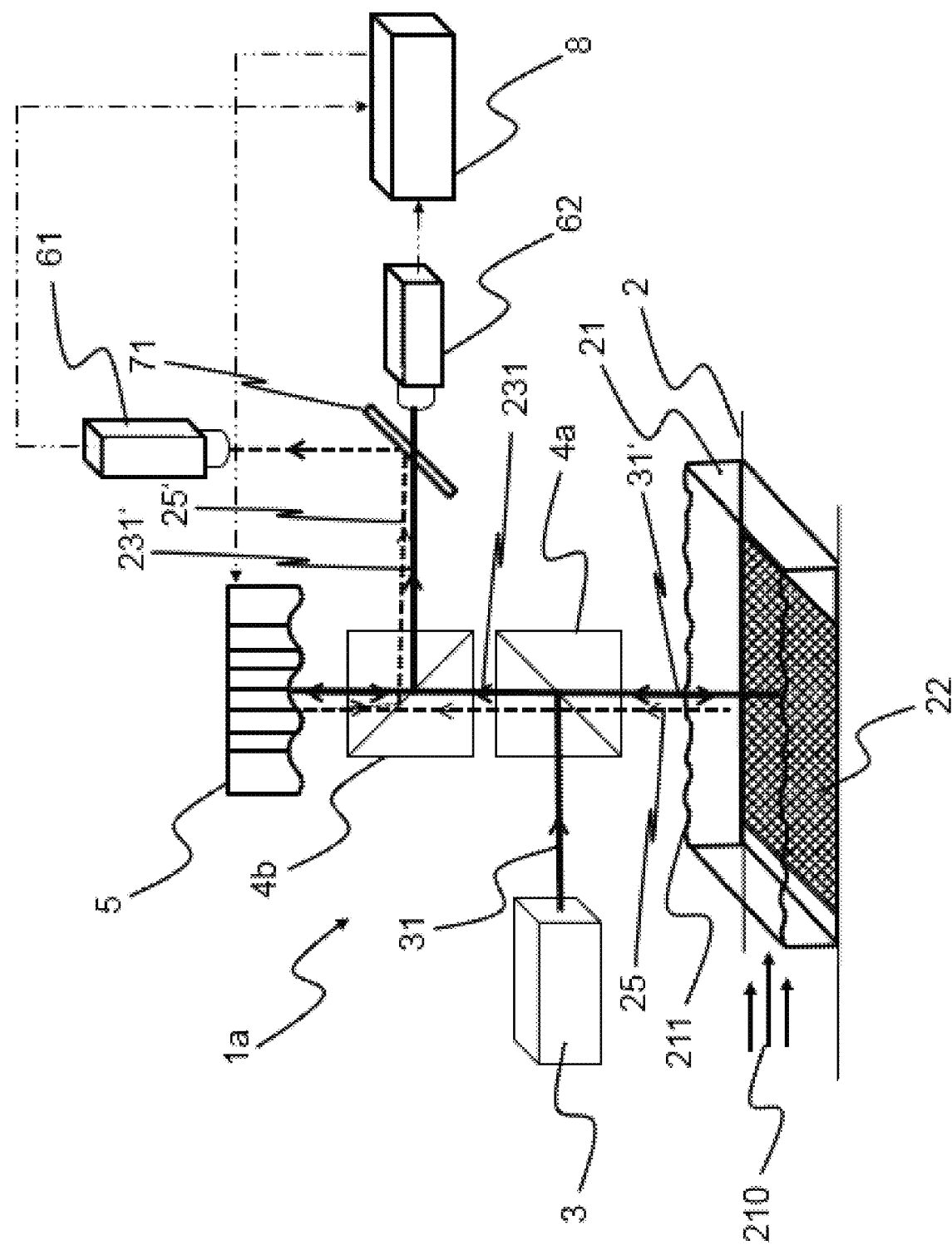
Figure 3:
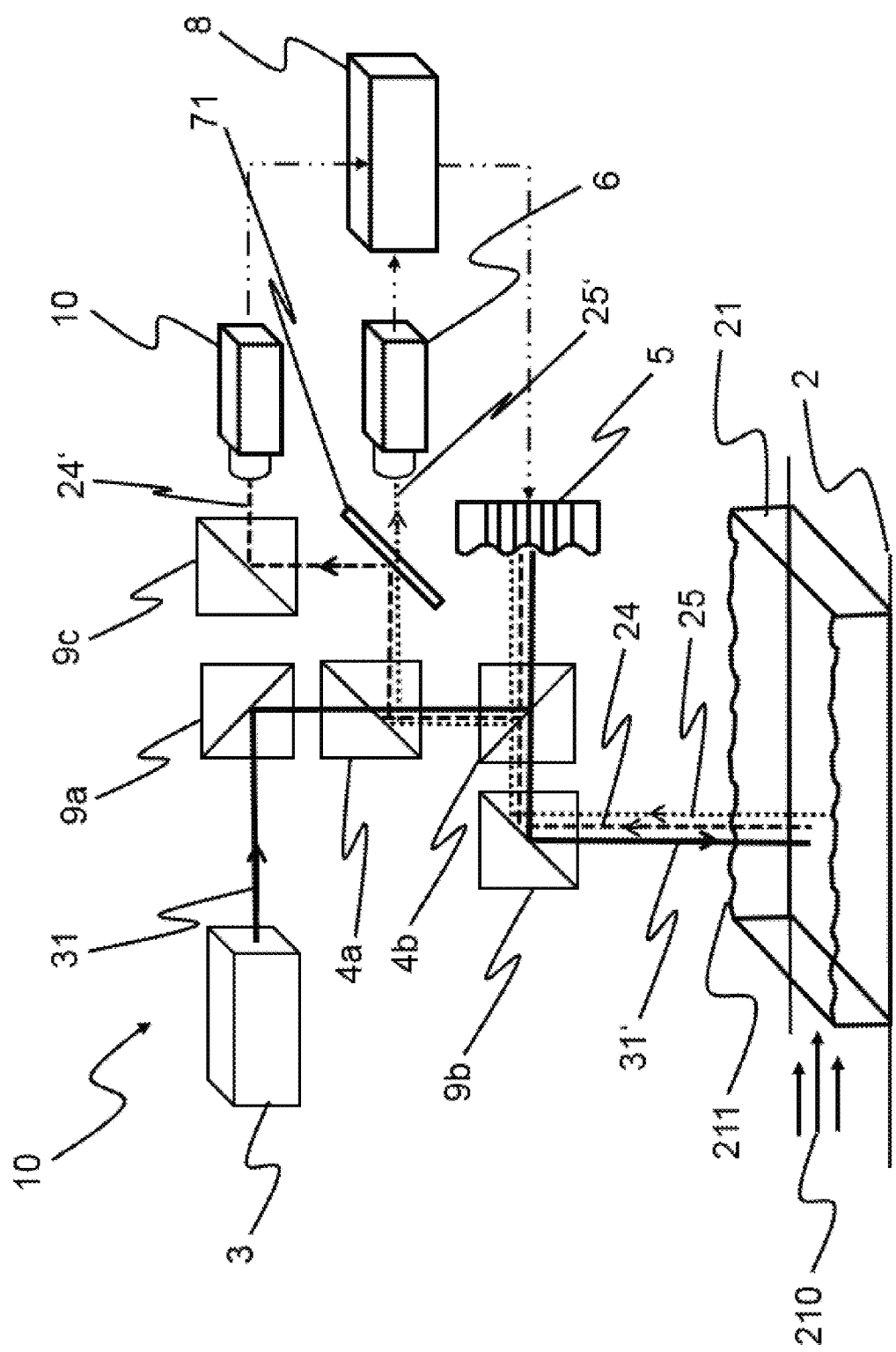

FIG. 1 a schematic representation of a wavefront-sensorless device for correcting optical disturbances through a boundary surface in an imaging flow measurement method, FIG. 2 a schematic representation of a further embodiment of a wavefront-sensorless device for correcting optical disturbances through a boundary surface in an imaging flow measuring method, wherein the flowing fluid contains particles, and FIG. 3 a schematic representation of a wavefront sensor-based arrangement for correcting optical disturbances through a boundary surface in an imaging flow measurement method.

FIG. 1 shows an exemplary embodiment of a wavefront-sensorless device 1 for correcting optical disturbance through a fluctuating boundary surface 211 in an imaging flow measurement method. A fluid 21 flows through a flow channel 2 in flow direction 210, wherein the fluid 21 has an open boundary surface 211 facing the environment. Therefore, scattering at the open boundary surface 211 therefore causes a fluctuating optical disturbance. For measurement by means of an imaging flow measurement method, the fluid 21 contains scattering particles (not shown). Disposed at the bottom of the flow channel 2 is a stationary pattern 22.

The illumination source 3 emits the illumination light 31, which is directed via a beam splitter 4a and another beam splitter 4b to a surface light modulator 5 and reflected thereby in the direction of the flow channel 2, so that the flowing fluid 21 and the pattern 22 are illuminated through the boundary surface 211. In the exemplary embodiment, the measuring field represents the illuminated area of the flow channel 2. Reflection at the surface light modulator 5 causes a defined distortion (hereinafter represented in each case by an apostrophe in the designation of the light components) of the light wavefront depending on the orientation of the elements of the surface light modulator 5. All of the light 23 scattered by the scattering particles in the flowing fluid 21 and at the pattern 22 is also reflected by the surface light modulator 5 and then reflected by the beam splitter 4b in the direction of the camera 6 after transmission through the beam splitters 4a, 4b. Disposed in front of the camera 6 is a wavelength bandpass filter 7 which passes only scattered light 23' of a narrow wavelength range about the wavelength of the illumination light 31 so as to filter out unwanted background radiation which does not result from the scattering at the flowing fluid 21 or pattern 22. Both the flow pattern, i.e. the image of the light 23' scattered by the scattering particles in the flowing fluid 21, and the pattern image, that is to say the image of the light 23' scattered by the pattern 22, are detected by means of the camera 6. The evaluation of the flow image and the pattern image and the control of the surface light modulator 5 is carried out using the signal processing platform 8, which communicates information with the camera 6 and with the surface light modulator 5 (as indicated by dashed-dotted lines in FIG. 1). The signal processing platform 8 can be a PC or an FPGA with the corresponding interfaces.

By means of the signal processing platform 8, the flow image is first separated from the pattern image, for example by means of a linear search. Then, the pattern image deformed by scattering at the boundary surface 211 is compared with the pattern 22 as an ideal target image, wherein a quality factor, for example the deviation of the pattern image from the pattern 22, is calculated. By way of example, the normalized cross-correlation coefficient of the pattern image and the pattern is used as the quality factor, whereby by definition the quality factor approaches the value 1 as the deviation between the pattern image and the pattern decreases, whereby the value 1 corresponds to a match between the pattern image and the pattern.

The signal processing platform 8 is communicates information with the surface light modulator 5 and controls the orientation of the elements that form its reflective surface, for example a plurality of individually controllable micromirrors. The elements of the surface light modulator 5 are driven by the signal processing platform 8 and the orientation of the elements iteratively varies such that the quality factor increases as the described method of illuminating the flowing fluid 21 and the pattern 22 and determining the quality factor and orientation of the surface light modulator 5. The iterative optimization is completed when the quality factor reaches a maximum or has exceeded a predetermined limit. Due to the fluctuating nature of the disturbance caused by the open boundary surface 211, optimization proceeds essentially continuously. In order to be able to execute the disturbance correction in real time, the optimization process as well as the orientation of the surface light modulator 5 must be carried out sufficiently quickly. In particular, the control rate of the arrangement 1 should be at least twice the maximum occurring fluctuation frequency of the disturbance.

Orienting the surface light modulator 5 to optimize the pattern image also results in the correction of the disturbance by the open boundary surface 211 relative to the flow pattern. The corrected flow pattern can be used with either the signal processing platform 8 or with another signal processing platform to determine the flow parameters using known methods such as PIV, PTV, MTV.

FIG. 2 shows another embodiment of a wavefront-sensorless device 1a for correcting optical disturbances by a fluctuating boundary surface 211 in an imaging flow measurement method. As in FIG. 1, a fluid 21 flows through a flow channel 2 in the flow direction 210, wherein the fluid 21 has an open boundary surface 211 facing toward the environment. Therefore, scattering at the open boundary surface 211 causes a fluctuating optical disturbance. The fluid 21 contains fluorescent particles (not shown), while the pattern 22 fixedly disposed on the underside of the flow channel 2 is non-fluorescent.

As in FIG. 1, the illumination source 3 emits the illumination light 31 which has an illumination wavelength $\lambda_1$. The illumination light 31 is directed using a beam splitter 4a and another beam splitter 4b to a surface light modulator 5 and reflected thereby in the direction of the flow channel 2, so that the flowing fluid 21 and the pattern 22 are illuminated through the boundary surface 211 by illumination light 31' at the illumination wavelength $\lambda_1$. Reflection at the surface light modulator 5 causes a defined distortion (hereinafter represented in each case by an apostrophe in the designation of the light components) of the light wavefront depending on the orientation of the elements of the surface light modulator 5.

A portion of the illumination light 31' is scattered at the stationary pattern 22 and undergoes no wavelength change in the process.

Another portion of the illumination light 31' is scattered by the fluorescent particles in the flowing fluid 21. After scattering at the fluorescent particles, the scattered light 25 has the wavelength $\lambda_2$ which in general is different from $\lambda_1$, and according to Stokes' rule is greater than $\lambda_1$.

The light 231 at $\lambda_1$ scattered at the pattern 22 and the light 25 which is referred to below as the fluorescent light and scattered by the particles are transmitted by the two beam splitters 4a and 4b to the surface light modulator 5. After the reflection at the surface light modulator 5, a deflection of the light 231' and the fluorescent light 25' scattered at the pattern 22 takes place by means of the beam splitter 4b in the direction of a dichroic filter 71. The dichroic filter 71 has a mirroring arrangement whose reflectance is a function of the wavelength of the light, so that the mirroring arrangement acts as a wavelength-selective beam splitter. Therefore, the dichroic filter 71 reflects light of a specific wavelength or a wavelength range to a high degree in a defined manner and transmits light of another specific wavelength or another wavelength range to a high degree. In the embodiment of FIG. 2, the dichroic filter 71 is designed so that the fluorescent light 25' at wavelength $\lambda_2$ is largely reflected by the dichroic filter 71 in the direction of a first camera 61 and thus the flow image is depicted on camera 61. The light 231' at wavelength $\lambda_1$ scattered at the pattern 22 is largely transmitted through the dichroic filter 71, and the pattern image is depicted on a second camera 62.

The evaluation of the flow image and the pattern image and the control of the surface light modulator 5 is done using the signal processing platform 8, which communicates with the cameras 61, 62 and with the surface light modulator 5 (indicated by dashed-dotted lines in FIG. 2). The signal processing platform 8 can be a PC or an FPGA with the corresponding interfaces.

By means of the signal processing platform 8, the pattern image deformed by scattering at the boundary surface 211 is compared with the pattern 22 as an ideal target image, wherein a quality factor is calculated, for example the deviation of the pattern image from the pattern 22.

The signal processing platform 8 communicates with the surface light modulator 5 and controls the orientation of the elements that form the reflective surface thereof based on an iterative optimization of the quality factor as described for FIG. 1. Orienting the surface light modulator 5 to optimize the pattern image also results in the correction of the disturbance by the open boundary surface 211 relative to the flow pattern. The corrected flow pattern is evaluated using the signal processing platform 8 and can be used to determine the flow parameters using known methods such as PIV, PTV, MTV.

FIG. 3 illustrates an embodiment of a wavefront sensor-based device 10 for correcting optical disturbances caused by a fluctuating boundary surface 211 in an imaging flow measurement process. As in FIGS. 1 and 2, a fluid 21 flows through a flow channel 2 in the flow direction 210, wherein the fluid 21 has an open boundary 211 facing towards the environment, and a scattering at the boundary surface 211 causes a fluctuating optical disturbance. For measurement by means of an imaging flow measurement method, the fluid 21 contains fluorescent particles (not shown).

The illumination source 3 emits the illumination light 31, which has an illumination wavelength $\lambda_1$. The illumination light 31 is directed to another beam splitter 4b by way of a reflection prism 9a or a mirror and a beam splitter 4a, and is reflected by the prism onto the surface light modulator 5, whereby the wavefront of the illumination light 31 receives a defined distortion (represented by an apostrophe in the designation of the light components). After reflection at the surface light modulator 5, transmission through the beam splitter 4b and deflection at a further reflection prism 9b in the direction of the flow channel 2, the flowing fluid 21 is illuminated with illumination light 31' at the illumination wavelength $\lambda_1$.

A portion of the illumination light 31' is reflected at the boundary surface 211 according to Fresnel's formulas due to the refractive index difference between the fluid 21 and the environment, and undergoes no wavelength change. The light reflected at the boundary surface at $\lambda_1$ is referred to as Fresnel light 24 below.

Another portion of the illumination light 31' is scattered by the fluorescent particles in the flowing fluid 21. After scattering at the fluorescent particles, the scattered light 25 has the wavelength $\lambda_2$ which in general is different from $\lambda_1$, and according to Stokes' rule is greater than $\lambda_1$. The Fresnel light 24 and the scattered light referred to below as fluorescent light 25 are deflected by the reflection prism 9b in the direction of the surface light modulator 5 and reflected by the modulator after transmission through the beam splitter 4b.

After the reflection at the surface light modulator 5, the Fresnel light 24' and the fluorescent light 25' are deflected by means of the beam splitters 4b and 4a in the direction of a dichroic filter 71. The dichroic filter 71 has a mirroring arrangement whose reflectance is a function of the wavelength of the light, so that the mirroring arrangement acts as a wavelength-selective beam splitter. Therefore, the dichroic filter 71 reflects light of a specific wavelength or a wavelength range to a high degree in a defined manner and transmits light of another specific wavelength or another wavelength range to a high degree. In the exemplary embodiment of FIG. 3, the dichroic filter 71 is designed such that the fluorescent light 25' at wavelength $\lambda_2$ is largely transmitted through the dichroic filter 71 in the direction of the camera 6 and the flow image is depicted on the camera 6. The Fresnel light 24' at wavelength $\lambda_1$ is largely reflected at the dichroic filter 71, and then deflected by means of a further reflection prism 9c in the direction of a wavefront sensor 10. The wavefront sensor 10 may be designed as a Hartmann-Shack sensor, for example.

The distortion of the wavefronts of the Fresnel light 24' detected by the wavefront sensor 10, said distortion caused by the boundary surface 211, is evaluated using the signal processing platform 8. By means of the signal processing platform 8, a parameter set for adjusting the surface light modulator 5 is then calculated in order to correct the determined wavefront distortion by aligning the elements of the surface light modulator 5. The control of the elements of the surface light modulator 5 is also performed by the signal processing platform 8. For this purpose, the signal processing platform 8 communicates with the wavefront sensor 10 and the surface light modulator 5 (indicated by dotted-dashed lines in FIG. 2). The signal processing platform 8 can be a PC or an FPGA with the corresponding boundary surfaces.

The evaluation of the flow pattern as an image of the fluorescent light 25' can also be carried out on the signal processing platform 8. For this purpose, the signal processing platform 8 additionally communicates with the camera 6.

The arrangement 1' comprises a closed loop. In order to be able to perform the control in real time, the update rate of the control loop must be selected to be at least twice as large as the maximum occurring fluctuation frequency of the optical disturbance caused by the open boundary surface 211.

The orientation of the surface light modulator 5 for optimizing the wavefront distortion of the Fresnel light 24' likewise corrects the disturbance in the flow pattern due to the open boundary surface 211. The corrected flow pattern may then be used to determine the flow parameters using known methods such as PIV, PTV, MTV.

REFERENCE SIGNS 1, 1a Wavefront-sensorless arrangement
10 Wavefront sensor-based arrangement 2 Flow channel
21 Fluid
210 Flow direction
211 Boundary surface
22 Pattern
23 Scattered light
23' Scattered light after reflection at the surface light modulator
231 Light scattered at the pattern
231' Light scattered at the pattern after reflection at the surface light modulator
24 Fresnel light
24' Fresnel light after reflection at the surface light modulator
25 Fluorescent light
25' Fluorescent light after reflection at the surface light modulator
3 Illumination source
31 Illumination light
31' Illumination light after reflection at the surface light modulator
4a, 4b Beam splitter
5 Surface light modulator
6 Camera
61 First camera
62 Second camera
7 Wavelength bandpass
71 Dichroic filter
8 Signal processing platform
9a, 9b, 9c Reflection prism
10 Wavefront sensor

The invention claimed is:

1. An arrangement for correcting optical disturbances caused by a boundary surface in imaging flow measuring methods for measuring a flowing fluid, wherein the flowing fluid contains tracers which are formed as scattering particles,
said arrangement comprising:
an illumination source designed to illuminate a measuring field through which the flowing fluid flows, wherein a stationary optical pattern is disposed in the measuring field;
at least one camera adapted to record the flow pattern as an image of the light scattered by the tracers in the flowing fluid and to record the pattern image as an image of the light scattered by the stationary pattern, wherein the illumination source and/or the at least one camera are arranged so that the illumination and/or the observation of the flowing fluid and the pattern is done through the boundary surface;
a controllable wavefront modulator is disposed in the optical path between the measuring field and the camera or in the optical path between the illumination source and the measuring field or in the optical path between the illumination source and the measuring field and between the measuring field and the camera;
a signal processing platform designed for evaluating at least the pattern image, wherein the pattern image is compared with the pattern to determine a quality factor of the image, and for controlling the wavefront modulator according to its orientation, wherein the wavefront modulator is oriented in a manner which iteratively optimizes the quality factor.

2. The arrangement according to claim 1, wherein:
the arrangement comprises a first camera and a second camera;
the tracers of the flowing fluid or the pattern are made fluorescent, or the tracers of the flowing fluid and the pattern are made fluorescent, the fluorescence wavelengths being different from each other;
means for wavelength selection are provided in the optical path between the measuring field and the cameras, wherein the means for wavelength selection are configured so that light of a first wavelength is detected predominantly using the first camera and light of a second wavelength is detected predominantly using the second camera.

3. The arrangement according to claim 2, wherein the means for wavelength selection are adapted as means for the partial reflection of light, the means comprising a mirroring arrangement which acts as a wavelength-dependent beam splitter.

4. The arrangement according to claim 2, wherein the means for wavelength selection comprise at least one wavelength-independent beam splitter and at least two wavelength-selective filter elements, wherein the wavelengths selected by means of the filter elements are different from each other.

5. The arrangement according to claim 1, wherein the wavefront modulator is a surface light modulator with a reflective illuminated surface and comprises a combination of a plurality of adaptive optical correction elements.

6. The arrangement according to claim 1, wherein the signal processing platform comprises an FPGA or a graphics processor or a digital signal processor or a combination thereof.

7. A method for correcting optical disturbances caused by a boundary surface in imaging flow measurement methods for measuring a flowing fluid, wherein the flowing fluid contains tracers designed as scattering particles, and wherein a stationary optical pattern is disposed in the measuring field through which the flowing fluid flows, wherein the flowing fluid is illuminated with an illumination source, the control of a wavefront modulator disposed in the optical path between the measuring field and a camera, wherein the camera is used for recording the flow pattern as an image of the light scattered by the tracers in the flowing fluid and for recording the pattern image as an image of the light scattered by the stationary pattern, or in the optical path between the illumination source and the light source, or in the optical path between the illumination source and the measuring field and between the measuring field and the camera being done in such a way as to iteratively optimize a quality factor determined by comparing the pattern image with the pattern.

8. An arrangement for correcting optical disturbances caused by a boundary surface in imaging flow measurement methods for measuring a flowing fluid, said flowing fluid containing tracers designed as fluorescent particles, the arrangement comprising
at least one illumination source designed to illuminate a measuring field through which the flowing fluid flows with light of at least one illumination wavelength through the boundary surface;
a wavefront sensor adapted to detect the light of the at least one illumination wavelength reflected from the boundary surface according to Fresnel's formulas;
a camera adapted to record the flow image as an image of the light scattered by the tracers of the flowing fluid at a wavelength which differs from the illumination wavelength;
means for partial reflection disposed in the optical path between the measuring field and the wavefront sensor and between the measuring field and the camera, said means comprising a mirroring arrangement acting as a wavelength-dependent beam splitter, wherein the light of the at least one illumination wavelength is deflected predominantly in the direction of the wavefront sensor, and light of a wavelength different from the at least one illumination wavelength is deflected predominantly in the direction of the camera;

a controllable wavefront modulator disposed in the optical path between the measuring field and the camera and between the measuring field and the wavefront sensor, or in the optical path between the illumination source and the measuring field, or in the optical path between the illumination source and the measuring field and between the measuring field and the camera and between the measuring field and the wavefront sensor;

at least one signal processing platform designed for evaluating at least the data detected by the wavefront sensor to determine the wavefront distortion due to the optical disturbance caused by the boundary surface and for controlling the wavefront modulator;

wherein the wavefront modulator is controlled by the signal processing platform in such a way that the determined wavefront distortion is corrected by way of interaction with the wavefront modulator.

9. The arrangement according to claim 8, wherein the flowing fluid contains tracers designed as scattering particles, wherein the arrangement is designed such that the measuring field through which the flowing fluid flows is illuminated through the boundary surface with light of a first illumination source at an illumination wavelength and the scattering particles are illuminated with light from a second illumination source at a wavelength which is different from the illumination wavelength, the camera being adapted to record the flow image as an image of the light with the wavelength different from the illumination wavelength which is scattered by the scattering particles of the flowing fluid, and wherein the means for partial reflection disposed between the measuring field and the camera are designed as a beam splitter.

10. The arrangement according to claim 8, wherein the wavefront sensor comprises a sensor of the Hartmann-Shack type.

11. The arrangement according to claim 8, wherein the wavefront sensor comprises an arrangement for performing holography.

12. The arrangement according to claim 8, wherein the wavefront modulator is a surface light modulator having a reflective illuminated surface and comprises a combination of a plurality of adaptive optical correction elements.

13. The arrangement according to claim 8, wherein the signal processing platform comprises an FPGA or a graphics processor or a digital signal processor or a combination thereof.

14. The arrangement according to claim 8, wherein the illumination source emits at least two wavelengths for illuminating the measuring field through which the flowing fluid flows, or in that the arrangement has at least two illumination sources, each emitting a different wavelength for illuminating the measuring field through which the flowing fluid flows, wherein a synthetic wavelength can be calculated from the at least two wavelengths, the synthetic wavelength being greater than each of the at least two wavelengths, and wherein by superposition of the light with at least two wavelengths different from one another reflected at the boundary surface, the absolute phase deviation due to the optical disturbance caused by the boundary surface is determined by means of the wavefront sensor, and wherein the wavefront modulator is controlled by the signal processing platform such that the determined absolute phase deviation is corrected by means of the interaction with the wavefront modulator.

15. A method for correcting optical disturbances caused by a boundary surface in imaging flow measurement methods for measuring a flowing fluid, wherein the flowing fluid contains tracers designed as fluorescent particles, comprising the following method steps:

a. illuminating a measuring field through which the flowing fluid flows through the boundary surface with light of at least one illumination wavelength and interacting the flowing fluid with the light of at least one illumination wavelength, the light, in accordance with the Fresnel formulas, having the at least one illumination wavelength at the boundary surface and a wavelength which is different from the at least one illumination wavelength after being scattered at the fluorescent particles of the flowing fluid;

b. separating the entirety of the light reflected from the boundary surface and the light scattered by the fluorescent particles as a function of the wavelength into a portion having the at least one illumination wavelength and a portion having a different wavelength from the at least one illumination wavelength;

c. deflecting the portion having the at least one illumination wavelength in the direction of a wavefront sensor, detecting the proportion comprising the at least one illumination wavelength by means of the wavefront sensor and evaluating the detected data by means of a signal processing platform for determining wavefront distortion;

d. deflecting the portion having a wavelength different from the at least one illumination wavelength in the direction of a camera and imaging the flow pattern on the camera;

e. evaluating the flow image by means of the one or a second signal processing platform;

wherein an interaction of the light reflected from the boundary surface and the light scattered by the fluorescent particles in the flowing fluid, or the light serving to illuminate the flowing fluid, or the light serving to illuminate the flowing fluid and the light reflected from the boundary surface and the light scattered by the fluorescent particles in the flowing fluid, occurs by means of a controllable wavefront modulator, and the wavefront modulator is controlled in such a way as to orient the same by means of the signal processing platform so as to correct the detected wavefront distortion by the interaction thereof with the wavefront modulator.

16. The arrangement according to claim 2, wherein the wavefront modulator is a surface light modulator with a reflective illuminated surface and comprises a combination of a plurality of adaptive optical correction elements.

17. The arrangement according to claim 3, wherein the wavefront modulator is a surface light modulator with a reflective illuminated surface and comprises a combination of a plurality of adaptive optical correction elements.

18. The arrangement according to claim 2, wherein the signal processing platform comprises an FPGA or a graphics processor or a digital signal processor or a combination thereof.

19. The arrangement according to claim 3, wherein the signal processing platform comprises an FPGA or a graphics processor or a digital signal processor or a combination thereof.

20. The arrangement according to claim 16, wherein the signal processing platform comprises an FPGA or a graphics processor or a digital signal processor or a combination thereof.

\* \* \* \* \*